(12) United States Patent
Brock

(10) Patent No.: US 11,495,137 B2
(45) Date of Patent: Nov. 8, 2022

(54) KEYBOARD TRAINING METHOD AND APPARATUS

(71) Applicant: Michael D. Brock, Murray, UT (US)

(72) Inventor: Michael D. Brock, Murray, UT (US)

( * ) Notice: Subject to any disclaimer, the term of this patent is extended or adjusted under 35 U.S.C. 154(b) by 0 days.

(21) Appl. No.: 16/590,250

(22) Filed: Oct. 1, 2019

(65) Prior Publication Data

US 2020/0105157 A1 Apr. 2, 2020

Related U.S. Application Data

(60) Provisional application No. 62/739,492, filed on Oct. 1, 2018.

(51) Int. Cl.
*G09B 15/02* (2006.01)
*G09B 21/00* (2006.01)

(52) U.S. Cl.
CPC ......... *G09B 15/026* (2013.01); *G09B 21/003* (2013.01)

(58) Field of Classification Search
CPC .............................. G09B 15/026; G09B 21/003
USPC ........................................................ 84/479 A
See application file for complete search history.

(56) References Cited

U.S. PATENT DOCUMENTS

| | | | | |
|---|---|---|---|---|
| 1,526,547 A * | 2/1925 | Hughey | ............... | G09B 15/026 283/44 |
| 2,221,143 A * | 11/1940 | Lang | ........................ | G10G 1/00 84/478 |
| 3,430,530 A * | 3/1969 | Grindinger | .............. | G10G 1/02 D17/9 |
| 3,616,723 A * | 11/1971 | Gullickson | .............. | G10G 1/02 84/478 |
| 4,516,465 A * | 5/1985 | Kani | ....................... | G09B 15/08 84/478 |
| 4,565,460 A * | 1/1986 | Kline | ......................... | B41J 5/12 400/490 |

(Continued)

OTHER PUBLICATIONS

"Engineering360, Which Electrical Tape is Right for Your Aplciation?, May 4, 2018, https://insights.globalspec.com/article/8728/which-electrical-tape-is-right-for-your-application#:~:text=Most%20standard%20monomeric%20and%20polymeric,to%2030%20mils%20or%20more." (Year: 2018).*

(Continued)

*Primary Examiner* — Christina M Schreiber
(74) *Attorney, Agent, or Firm* — Dobbin IP Law, P.C.; Geoffrey E Dobbin

(57) ABSTRACT

A method of teaching keyboard instruments involves placing semi-permanent plates on specific keys of the keyboard, providing tactile stimulation which will develop muscle memory and confidence in playing correct notes. Different textures and colors may be employed to help differentiate plates and associated keys from others. Placement of plates on keys is to be determined by the instructor in consideration of the student's needs. Placement may be made on one or multiple keys, which may include an entire middle octave. Texturing may be a subtle as Braille characters or more bold designs and individual shapes of the plates may be flat or may be shaped to facilitate hand posture. Colors may be associated with specific notes on the grand staff to provide a visual aid. Finger adornments may also be used to aid in color correspondence. Plates may be held onto piano keys by utilizing either wet or dry adhesives.

20 Claims, 12 Drawing Sheets

(56) References Cited

U.S. PATENT DOCUMENTS

| | | | | |
|---|---|---|---|---|
| 5,254,008 A * | 10/1993 | Dawson | ............... | G09B 15/006 |
| | | | | 434/227 |
| 5,396,023 A * | 3/1995 | Pye | ............... | G10C 3/12 |
| | | | | 84/704 |
| 5,515,763 A * | 5/1996 | Vandervoort | ............ | G10C 3/12 |
| | | | | 84/437 |
| 5,546,843 A * | 8/1996 | Degaard | ............... | G09B 15/006 |
| | | | | 84/478 |
| 6,284,961 B1 * | 9/2001 | Kimmel, Jr. | ......... | G09B 15/026 |
| | | | | 84/478 |
| 6,987,220 B2 * | 1/2006 | Holcombe | ........... | G09B 15/026 |
| | | | | 84/485 R |
| 7,394,004 B2 * | 7/2008 | Muramatsu | ............... | B44F 9/06 |
| | | | | 84/174 |
| 8,049,092 B1 * | 11/2011 | Vaughan | ............... | G09B 15/08 |
| | | | | 84/470 R |
| 8,304,641 B1 * | 11/2012 | Stewart | ............... | G09B 15/026 |
| | | | | 84/483.2 |
| 8,912,418 B1 * | 12/2014 | Cohen | .................... | G10H 1/342 |
| | | | | 84/483.2 |
| 9,646,584 B1 * | 5/2017 | Dorety | .................... | G10G 1/02 |
| 10,347,228 B2 * | 7/2019 | McCartney | .......... | G09B 15/026 |
| 10,403,250 B2 * | 9/2019 | Rodriguez | .......... | G06F 3/04817 |
| D881,265 S * | 4/2020 | Rhone | ............... | D17/9 |
| D903,752 S * | 12/2020 | Rhone | ............... | D17/1 |
| 2004/0074376 A1 * | 4/2004 | Varme | ................... | G10G 1/00 |
| | | | | 84/483.2 |
| 2010/0005952 A1 * | 1/2010 | LaMon | ................. | G09B 15/02 |
| | | | | 84/478 |
| 2020/0105157 A1 * | 4/2020 | Brock | ................. | G09B 21/003 |

OTHER PUBLICATIONS

"ScienceDirect, Polymer Films, section 1.1.1 Polymeric Films and Sheets, 2017, https://www.sciencedirect.com/topics/materials-science/polymer-films#:~:text=1.1.&text=Polymeric%20films%20are%20defined%20as,thick." (Year: 2017).*

"FindTape, 3M 22 Scotch Heavy-Duty Grade Extra Thick Electrical Tape, 2004, https://www.findtape.com/3M-Scotch-22-Heavy-Duty-Grade-Electrical-Tape/p673/" (Year: 2004).*

"Electrowind, 10 Mil (0.25 mm thick) Grade K Kraft Press-Paper Flexible Laminate, 2017, https://www.electro-wind.com/10-mil-0-25-mm-thick-grade-k-kraft-press-paper-flexible-laminate-105-c-brown-48-wide-roll.html" (Year: 2017).*

"StickerBuzz, What is teh mil (thickness) of your stickers?, 2021, https://stickerbuzz.com/faq/3067/what-is-the-mil-thickness-of-your-stickers" (Year: 2021).*

"Stickermule, What is teh mil (thickness) of your stickers?, 2021, https://www.stickermule.com/support/what-is-the-mil-thickness-of-your-stickers" (Year: 2021).*

Bump Dots, Peel-and-Stick Dots to Mark Everyday Items, Braille Superstore, waybackdate May 10, 2013, https://web.archive.org/web/20130510184743/http://www.braillebookstore.com/Bump-Dots.1 (Year: 2013).*

* cited by examiner

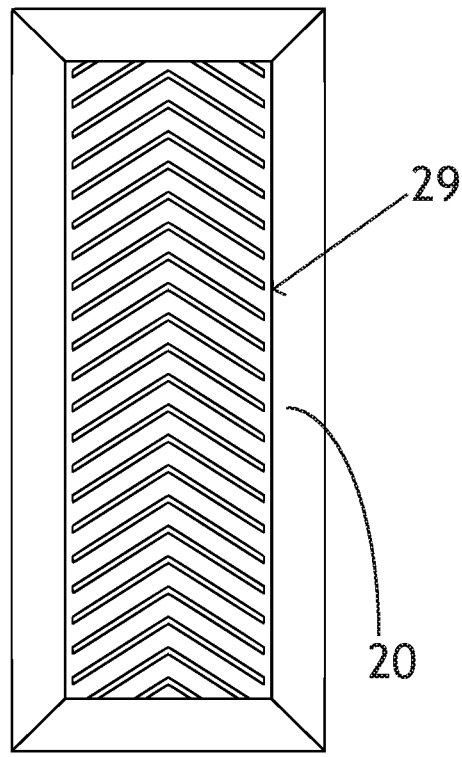
FIG. 3
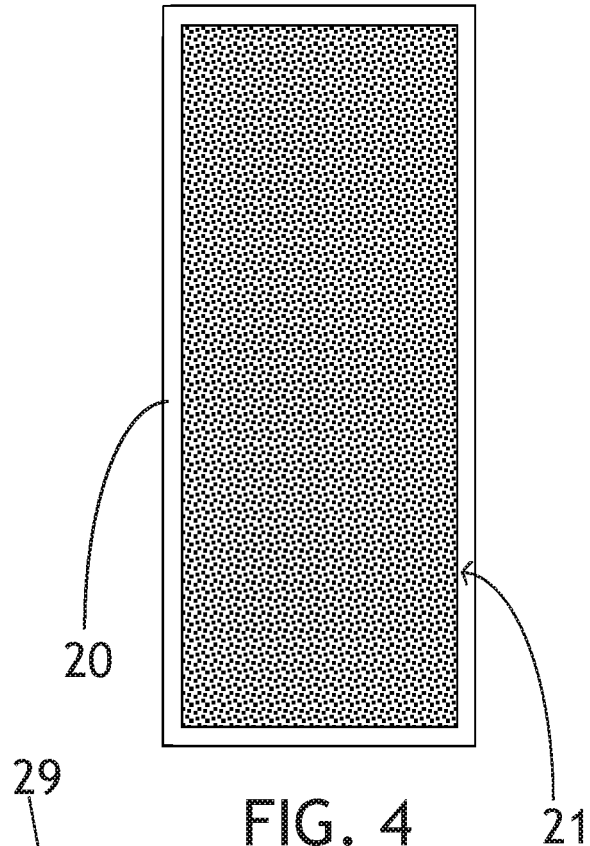
FIG. 4
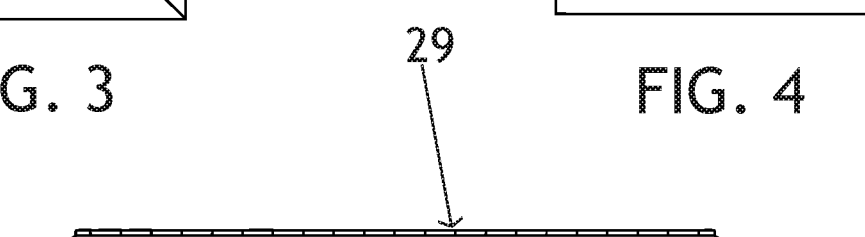
FIG. 5
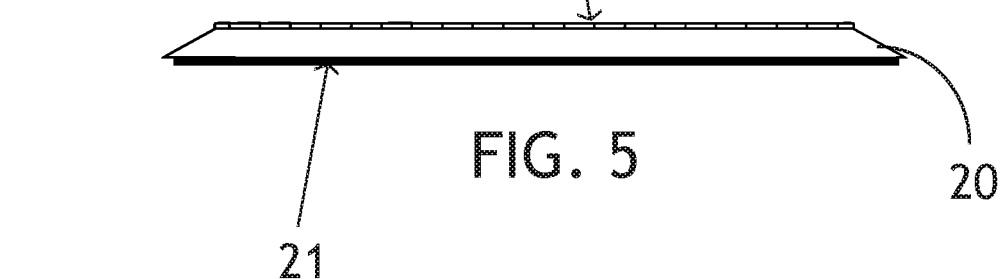
FIG. 6
FIG. 7

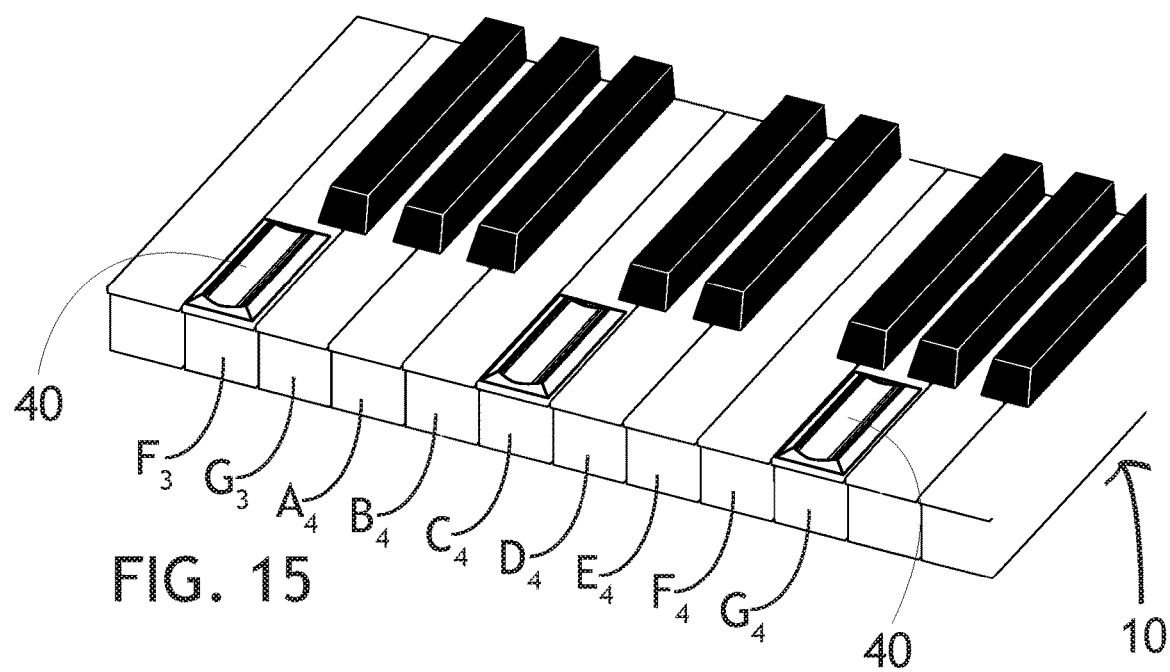
FIG. 15
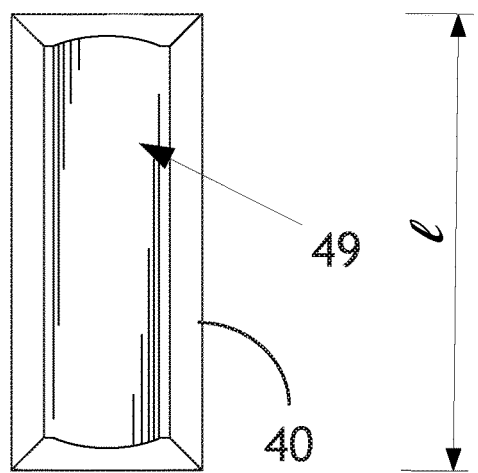
FIG. 16
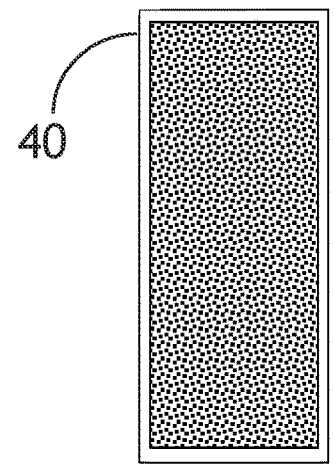
FIG. 17
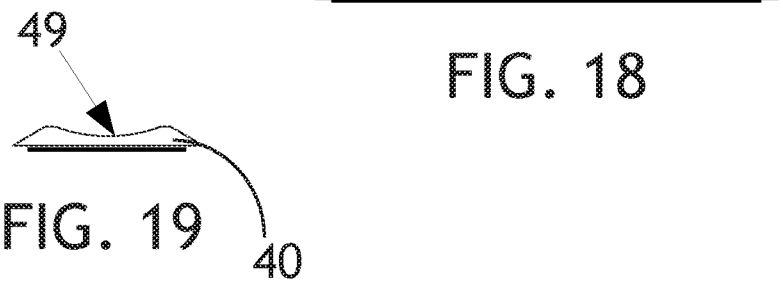
FIG. 18
FIG. 19
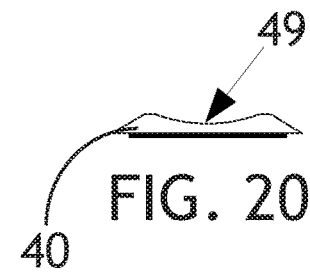
FIG. 20

KEYBOARD TRAINING METHOD AND APPARATUS

CROSS-REFERENCES TO RELATED APPLICATIONS

This Application claims priority as a non-provisional perfection of prior filed U.S. Application No. 62/739,492, filed Oct. 1, 2018, and incorporates the same by reference herein in its entirety.

FIELD OF THE INVENTION

The present invention relates to the field of education and more particularly relates to a method and apparatus used in the training of students in the playing of a piano or other instrument with a keyboard.

BACKGROUND OF THE INVENTION

Many parents want their children to have some basic level of musical education. Adults who have not gotten this training often find a desire to learn. To this end, the piano, or pianoforte as it was originally named, is often the most chosen instrument for general musical education. With the piano, each key represents a single, discrete note which may be played individually or in conjunction with other discrete notes to form chords. Since the action of playing a single note is as simple as striking a given key on the keyboard, it is generally easier for a student to associate a given note's sound and position on the keyboard with its position on the grand staff. With this knowledge, it is then easier for a student to take up other instruments and learn to play them as well.

While it may be "easier" for students to make the associations of note position and sound to the grand staff while playing piano, it is by no means easy. Mastering the skill takes hours upon hours of practice so that one can play without looking at the keyboard. This tends to be frustrating to many students in their early training. Often students begin learning a specific set of nine keys within the middle of the grand staff and expanding from there. While this is easier than learning the complete set of eighty-eight keys (as is found on the standard grand piano), it still requires the student to learn where the basic nine keys are by muscle memory. This stage frustrates many new students to the point where they give up and quite possibly try to rebel against parents and teachers regarding the subject.

Many training aids have been developed in which to help students make the transition between a "hunt-and-peck" student who must look for the appropriate keys to play in a given musical piece to a more proficient student who has no such need and is ready to expand beyond the basic nine keys. These aids tend to focus solely on visual correspondence, and not on direct tactile stimulation, to aid in finger placement and eventually develop muscle memory. One common tactic is to place a sticker on specific keys, such as middle C, or even all keys in an octave. Being flat sheets, stickers do not provide repeatable tactile stimulation, especially if presented over the course of a whole octave. Stickers also wear off over time, leaving an adhesive residue.

Learning by using only the eyes also lends to an eventual difficulty in weening the student from using the teaching aids. This difficulty is a significant cause of students dropping the piano as many cannot effectively make the transition of a beginning player who must consistently use visual cues to a more accomplished student who can trust their body to do what they want it to do. Learning by tactile stimulation, whether in conjunction with visual stimulation or not, helps the student not rely only on the eyes and aids the student in becoming familiar with hand position. What is needed then is a method and teaching aid which focuses on developing the muscle memory of the student so that dependence on the eyes may be decreased as skill improves, to the point of being eliminated.

The present invention is a method utilizing at least one plate which is positioned on at least one piano key. The plate provides tactile stimulation which aids in muscle memory development. By strategically positioning the plates, one can train a student as to where a given key is by touch and finger positioning alone. Then, when the student is ready to expand beyond the basic nine keys, the transition will be easier and more effectively done. While visual aids such as plate color can still be utilized, the presence of the plates on a given set of keys eventually aids in the transition to muscle memory alone as the student relies less on the eyes and more on the fingers. For those who need or just learn better with visual cues, rings or other adornments may be placed on individual fingers to aid in the association of finger to colored plate to key. The present application differentiates a "sheet" from a "plate" in that a sheet corresponds to a sheet of paper, typically having a thickness of less than 0.1 mm and in almost no event more than 0.2 mm. Such slight thicknesses are more difficult to differentiate by touch and are also more prone to wear. A plate is more three-dimensional and will generally have a thickness greater than a sheet, though one could be variable in thickness, as will be discussed later in this Application, so that it may present an edge that is on the scale of a sheet.

The present invention represents a departure from the prior art in that the method and apparatus of the present invention allows for tactile and muscle memory training of a student on a keyboard with decreased reliance on sight. If properly shaped, the training apparatus may also facilitate the proper positioning of fingers when playing. The method and apparatus may also be adapted to teach those with failing or failed eyesight.

SUMMARY OF THE INVENTION

In view of the foregoing disadvantages inherent in the known types of training aids and methods, an improved keyboard training method and aid that meets the following objectives: the method is easy to teach and helps in mastery of the keyboard, the training aid is easy and inexpensive to manufacture; and, application of the training aid does not permanently alter the keyboard. As such, a new and improved training method and apparatus may comprise at least one narrow plate fitted for semi-permanent placement on at least one key of the keyboard to accomplish these objectives.

The more notable features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in several ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a top plan view of the training aid used in FIG. 1.

FIG. 4 is a bottom plan view of the training aid of FIG. 3.

FIG. 5 is a side elevation of the training aid of FIG. 3.

FIG. 6 is a front elevation of the training aid of FIG. 3.

FIG. 7 is a rear elevation of the training aid of FIG. 3.

FIG. 15 is a perspective view of a partial keyboard with further alternate training aids installed.

FIG. 16 is a top plan view of the training aid used in FIG. 15.

FIG. 17 is a bottom plan view of the training aid of FIG. 17.

FIG. 18 is a side elevation of the training aid of FIG. 17.

FIG. 19 is a front elevation of the training aid of FIG. 17.

FIG. 20 is a rear elevation of the training aid of FIG. 17.

DETAILED DESCRIPTION OF THE PREFERRED EMBODIMENTS

With reference now to the drawings, a preferred embodiment of the keyboard training method and apparatus is herein described. It should be noted that the articles "a", "an", and "the", as used in this specification, include plural referents unless the content clearly dictates otherwise. It should also be noted that the methodology of instruction taught herein may be used on any instrument which utilizes a keyboard, including but not limited to the piano, organ, electric keyboard, accordion, and harpsichord.

Figure 1:
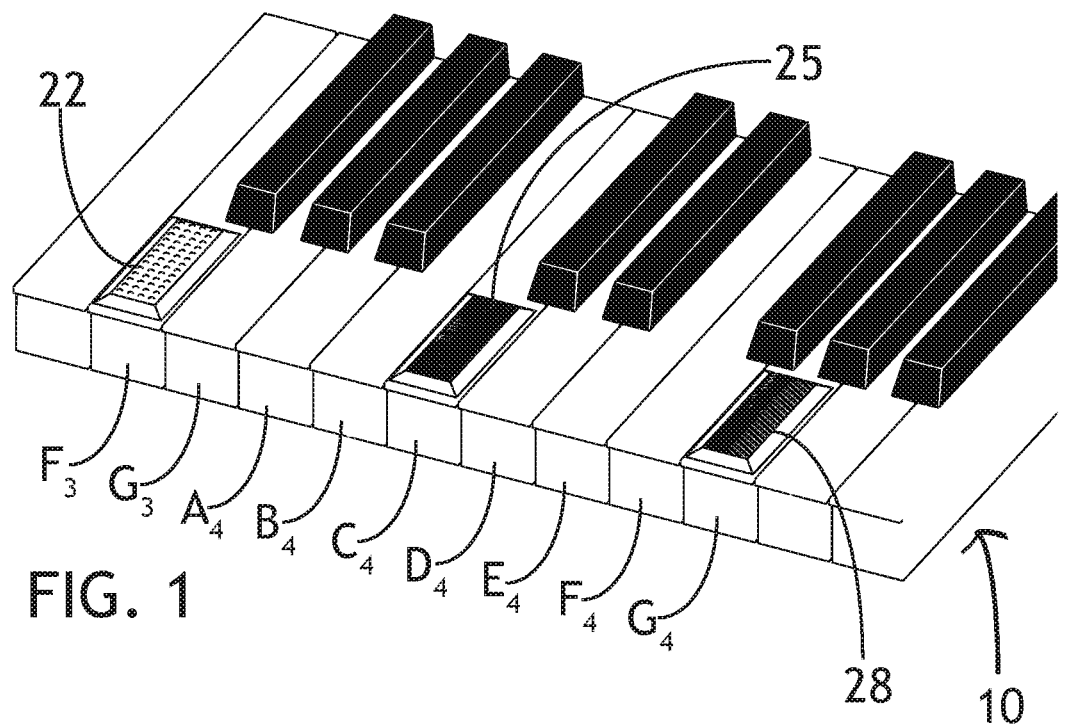
FIG. 1 is a perspective view of a partial keyboard with training aids installed.
Figure 2:
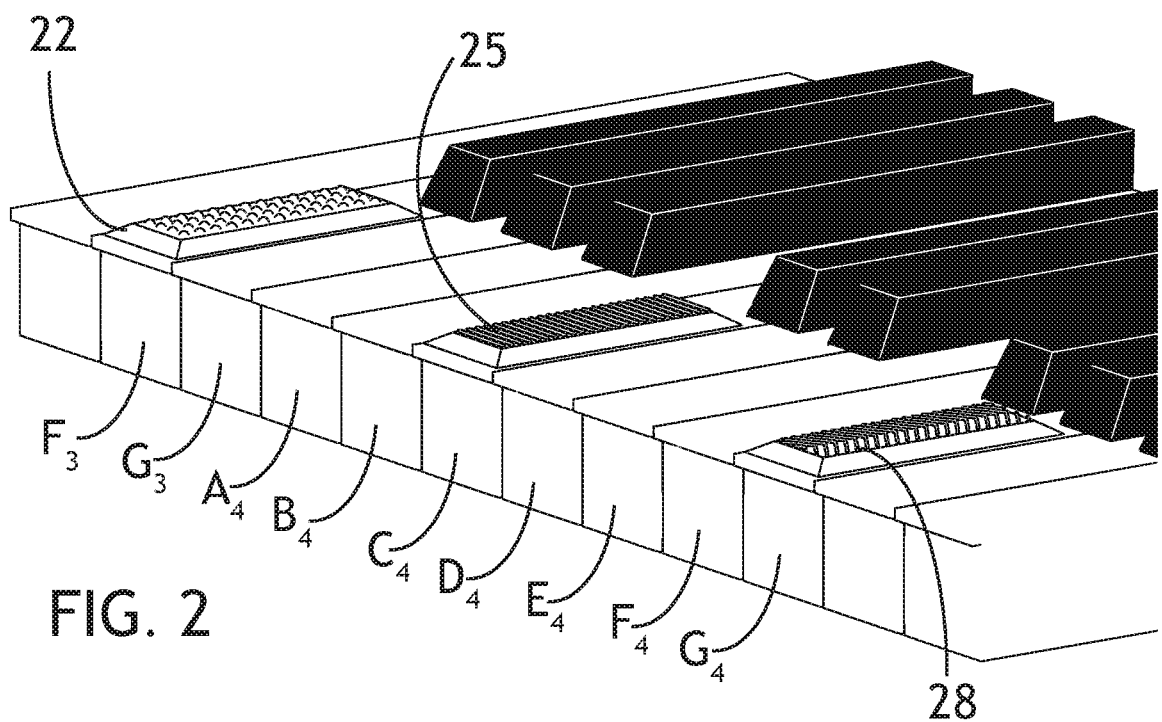
FIG. 2 is an alternate perspective view of the keyboard of FIG. 1.

With reference to FIGS. 1 and 2, the method involves placing at least one removable plate on at least one specific key on the keyboard 10. The depicted methodology places plate 22 on the key corresponding to the note $F_3$, plate 25 on $C_4$, and plate 28 on $G_4$. The plates may be of any shape, size, or color that would fit on a standard key in a keyboard. As seen in FIGS. 3-7, one embodiment of the plate 20 features a textured top face 29 and a smooth bottom face. The smooth bottom face interacts with the individual key in the keyboard 10 and may be semi-permanently secured with an adhesive 21 or dual-sided tape. The top face 29 is ideally textured to provide friction and tactile stimulation. However, it should be readily understood that a plate's presence on a key alone will provide enough tactile stimulation so that a player will be able to locate the player's hands on the keyboard 10, so a smooth top face 29 is also possible and should be understood to be a part of the disclosure of the invention. The depicted plates 20, if made for a standard piano keyboard, should have a length of approximately 1.875 inches (47.625 mm), width of approximately 0.75 inches (19.050 mm), and height of approximately 0.125 inches (3.175 mm), but these measurements are only exemplary. Shorter training aids, such as the second embodiment in FIGS. 8-14, or thinner (by height or width) training aids are possible.

Figure 8:
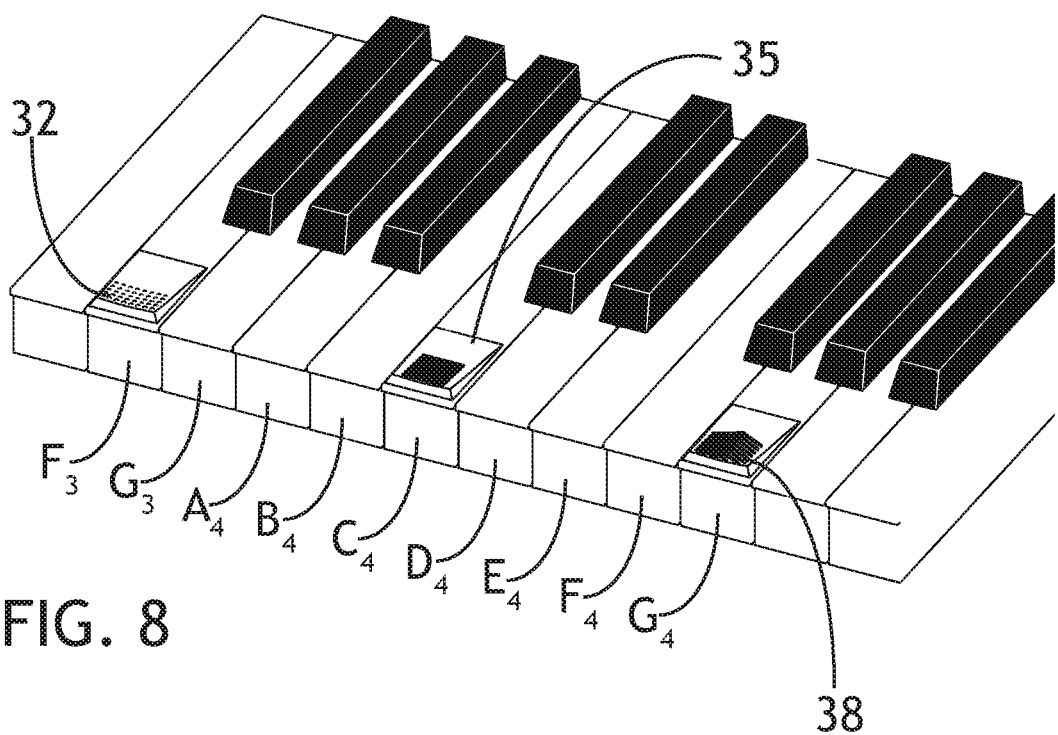
FIG. 8 is a perspective view of a partial keyboard with alternate training aids installed.
Figure 9:
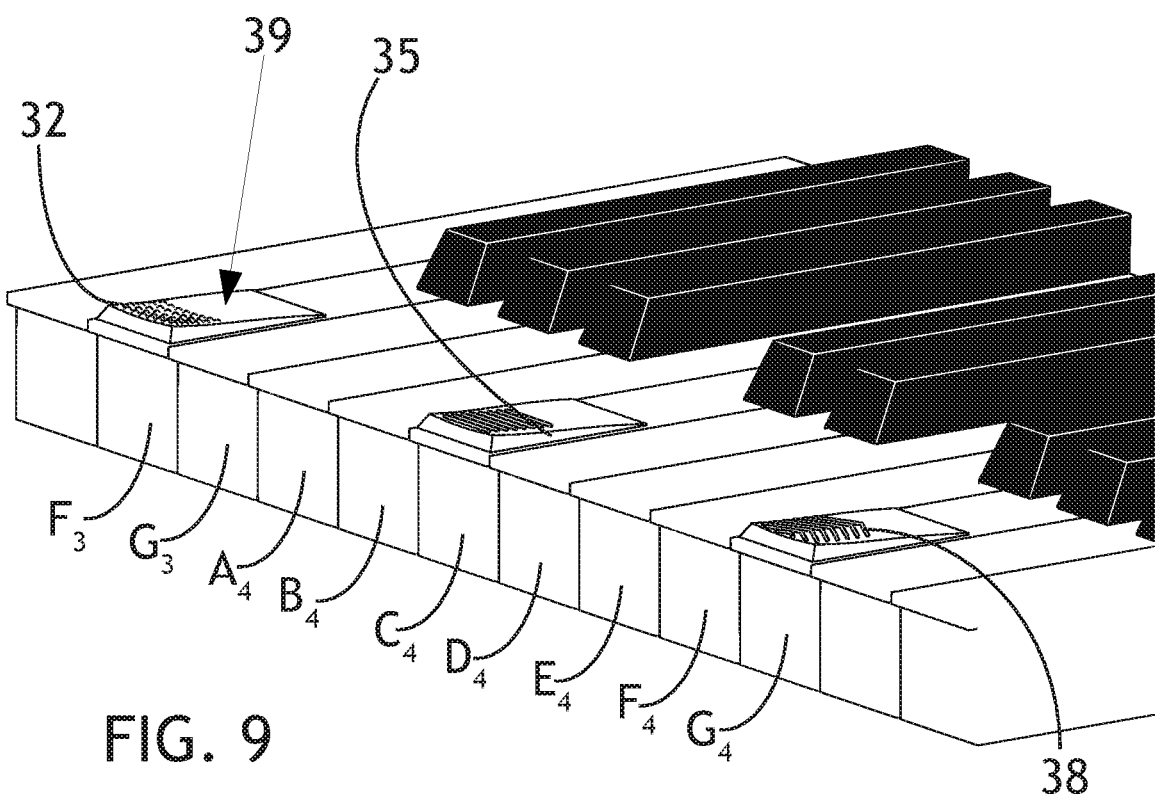
FIG. 9 is an alternate perspective view of the keyboard of FIG. 8.
Figure 10:
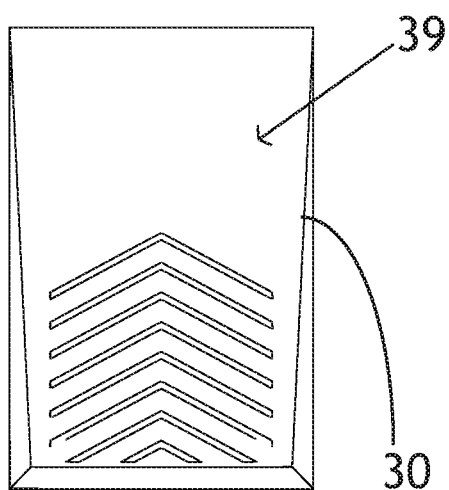
FIG. 10 is a top plan view of the alternate training aid used in FIG. 8.
Figure 11:
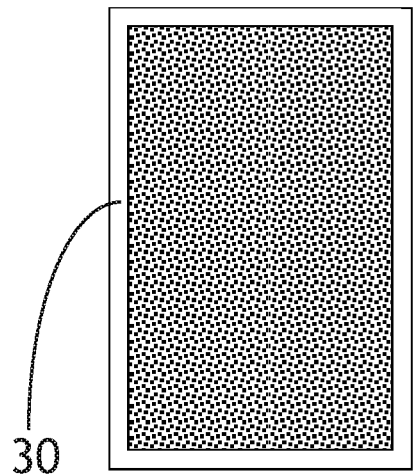
FIG. 11 is a bottom plan view of the training aid of FIG. 10.
Figure 12:
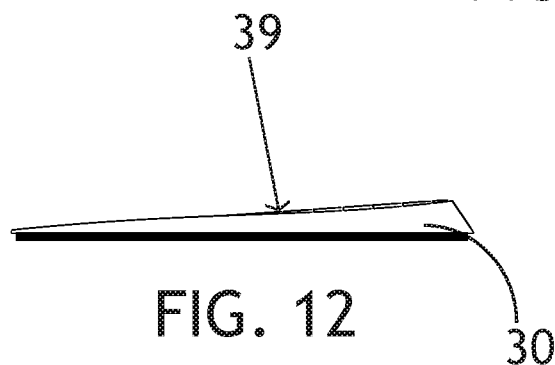
FIG. 12 is a side elevation of the training aid of FIG. 10.
Figure 13:
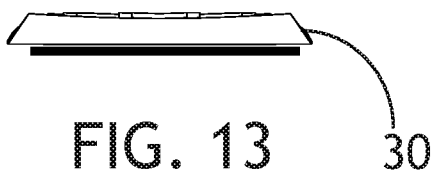
FIG. 13 is a front elevation of the training aid of FIG. 10.
Figure 14:
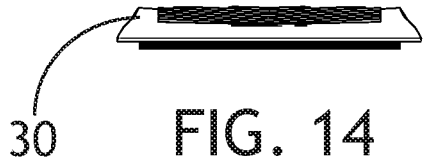
FIG. 14 is a rear elevation of the training aid of FIG. 10.

As stated before, the plates may take any shape or size so long as tactile stimulation may be provided. Another embodiment may also encourage proper finger position and is shown in FIGS. 8-14. These plates 30 likewise fit on a given key of the keyboard 10 and have bottom and top 39 faces. However, the top faces 39 are angled (having a height of 0.125 to 0.019 inches, or 3.175 to 0.482 mm) and positioned such that the top face 39 directs away from the player and terminates at an edge. This shape encourages the player to curl his or her fingers into what is considered proper playing position. Individual training aid top faces 39 may also present different patterns 32, 35, 38, as is depicted in FIGS. 8 and 9, which may cover the entire top face 39 or only a part of it.

An additional embodiment of training aids is depicted in FIGS. 15-20, where training aid 40 presents a concave top face 49. This concave top face 49, with an axis along the length l of the training aid 40, inherently positions fingers towards the center of the training aid, and thus the piano key, when properly positioned on the key.

Figure 21:
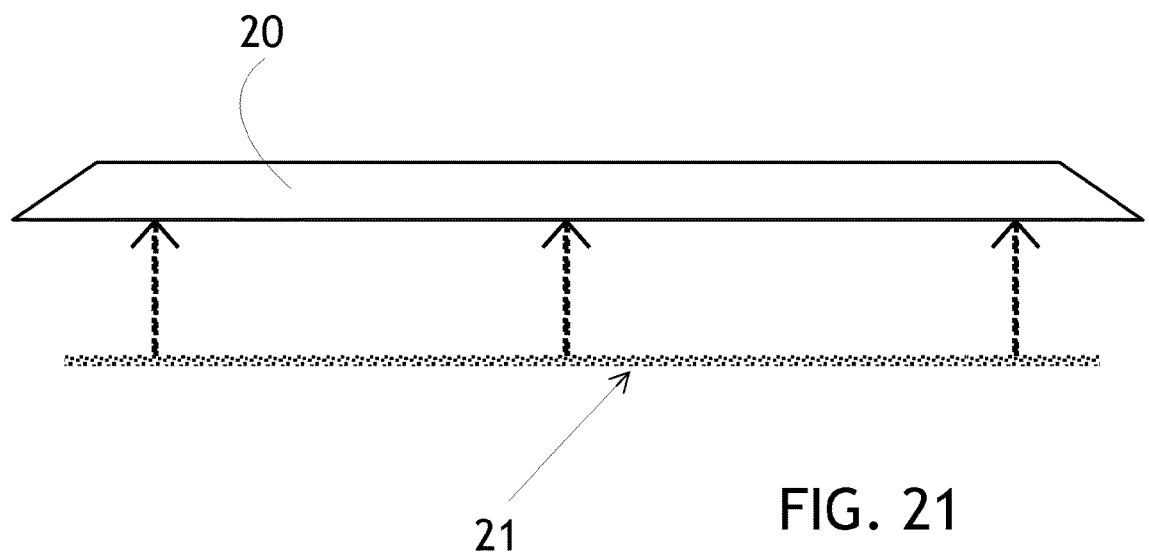
FIG. 21 is an exploded view of the training aid of FIG. 3.
Figure 22:
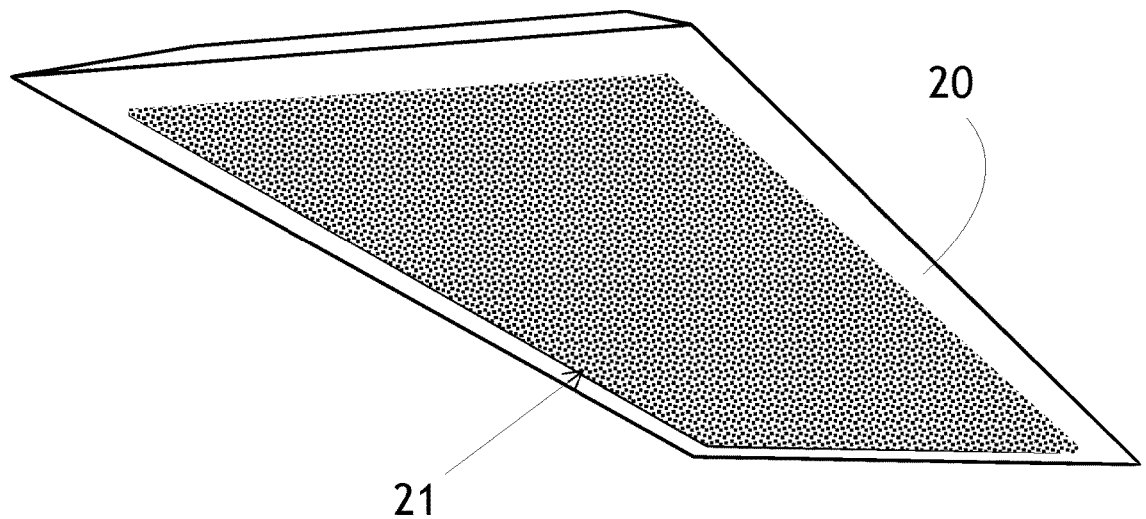
FIG. 22 is a perspective view of the training aid of FIG. 3.

FIGS. 21 and 22 depict the addition of an adhesive 21 to a plate 20. The adhesive 21 used in securing a plate 20 to a key may be either a traditional wet adhesive, such as a glue or other bonding agent applied to a double-sided tape, or a dry adhesive. When the term "adhesive" is used generally in this Specification and the appended claims, the term should be read to specifically include both dry and wet adhesives. Wet adhesives rely on the viscoelasticity of the bonding agent to adhere to a surface. Dry adhesives are rather new in the field of adhesive materials and are materials which utilize biomimetic structures to emulate the adhesion structures found in nature, most commonly the gecko. These adhesives tend to rely on the natural van der Waals forces between contacting surfaces to generate adhesive counter force. Many different strategies for creating dry adhesives are being explored and marketed today. Among these are the products known as GECKSKIN, by Felsuma, LLC, and SETEX, by nanoGriptech, Inc. Generically, these types of products may colloquially be known as "gecko tape" where one or both sides of the product are manufactured with the biomimetic dry adhesive. In either event, the use of such dry adhesives is preferred for use in the adhesion of the plates to keys on the keyboard. The use of the plates is intended to be temporary—only until they are no longer needed. As such, it is desirable to remove the plates at that time. When using dry adhesives, the plates may be removed without leaving a residue on the keys or causing other damage.

Figure 23:
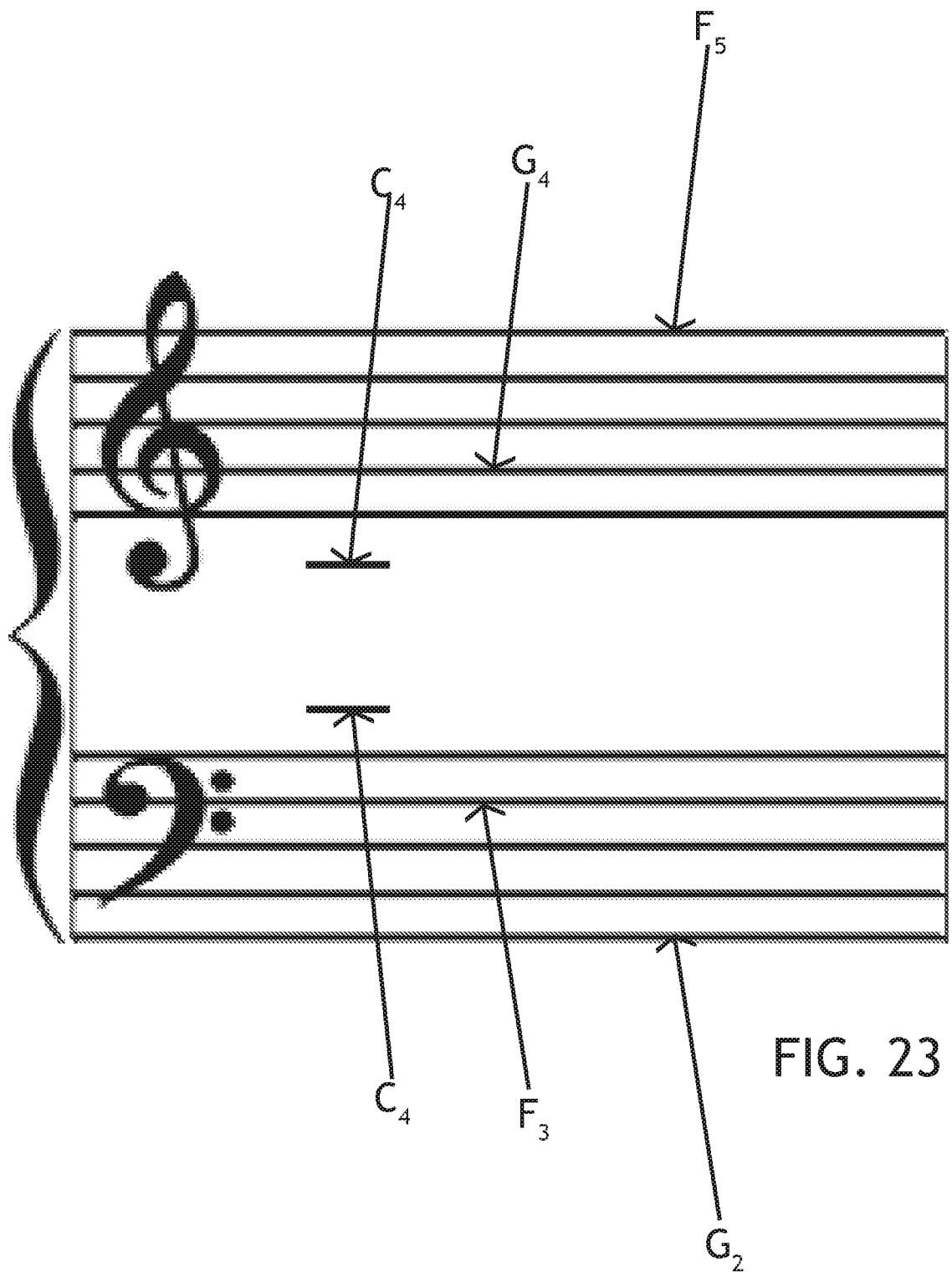
FIG. 23 is a depiction of a grand staff.

The method involves intentional placement of the plates 20 on specific keys of the keyboard 10 to serve as anchors to train muscle memory for the pupil. When playing the piano and practicing, the pupil will begin to associate the feel of the plates 20 with certain notes. Eventually, the pupil will associate the positioning of the hands with playing the proper notes and the plates may be removed. FIG. 23 depicts a grand staff with both G and F-clefs. The G-clef (or treble clef) is the top clef and is so named because its circle surrounds the line denoting note $G_4$. The F-clef (or bass clef) is named because its dots surround note $F_3$. Between the staves which make up the grand staff is Middle C ($C_4$), which corresponds to a sound frequency of approximately 261.626 Hz. The extreme ends of the grand staff are notes $G_2$ and $F_5$. The notes are named by their position as the nth note from the start of the keys on the grand piano, having 88 keys. So, the middle C is the $4^{th}$ C from the bottom note (A1) on the grand piano and is in the $4^{th}$ octave.

Figure 24:
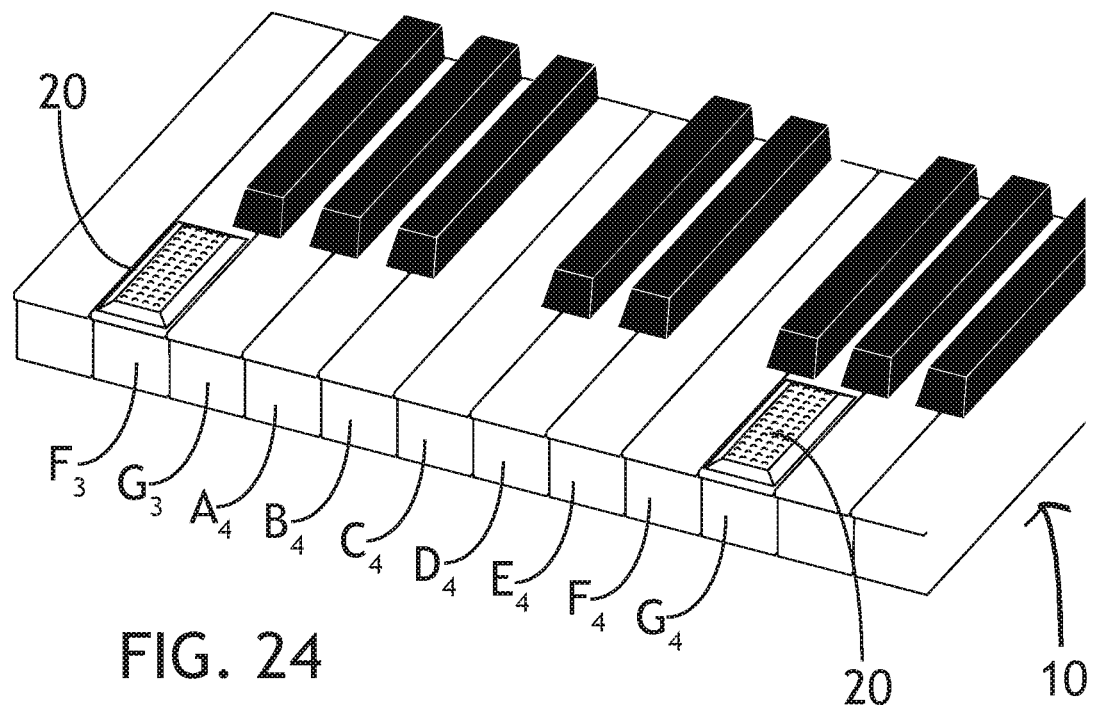
FIG. 24 is a perspective view of a partial keyboard with training aids installed according to one method of instruction.
Figure 25:
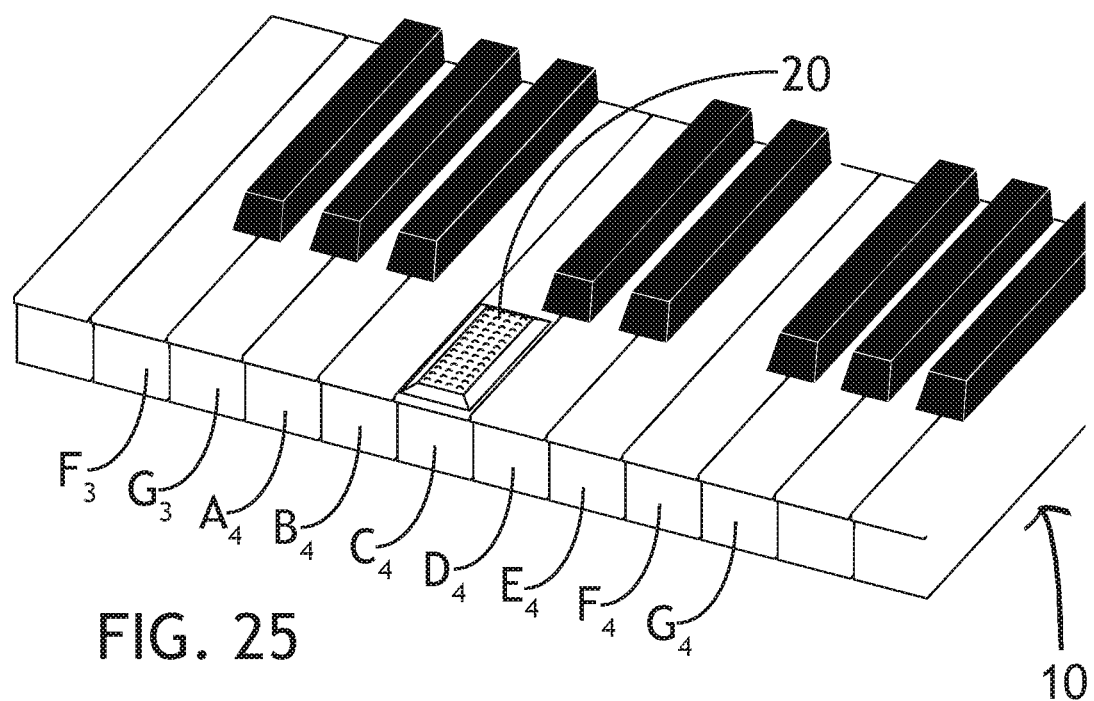
FIG. 25 is a perspective view of a partial keyboard with training aids installed according to an alternate method of instruction.

Placement of the plates 20 depends on the preference of the teacher and the needs of the student. The methodology depicted in FIGS. 1 and 2 shows placement of plates 22, 25, 28 on notes $F_3$, $C_4$, and $G_4$ respectively. When learning the piano, most students stay within this range of nine notes ($F_3$, $G_3$, $A_4$, $B_4$, $C_4$, $D_4$, $E_4$, $F_4$, $G_4$) the extreme notes of which are marked by the G and F-clefs. So, placing a plate on these extreme notes ($F_3$ and $G_4$) helps train the student to stay within the appropriate area of the keyboard. Middle C ($C_4$) may also be marked with a plate, as seen in FIGS. 1 and 2, or not, as is seen In FIG. 24. Likewise, it may be the only key marked with a plate as is shown in FIG. 25. Placement of plates would be up to the purview of the instructor and based on the needs of the student. It should be realized that the keys of an octave (the 7 white and 5 black) merely repeat each other with each progressive octave on the keyboard. So, when the student masters the basic nine white keys between $F_3$ and $G_4$, transition to keys outside of that set range should be easier.

Figure 26:
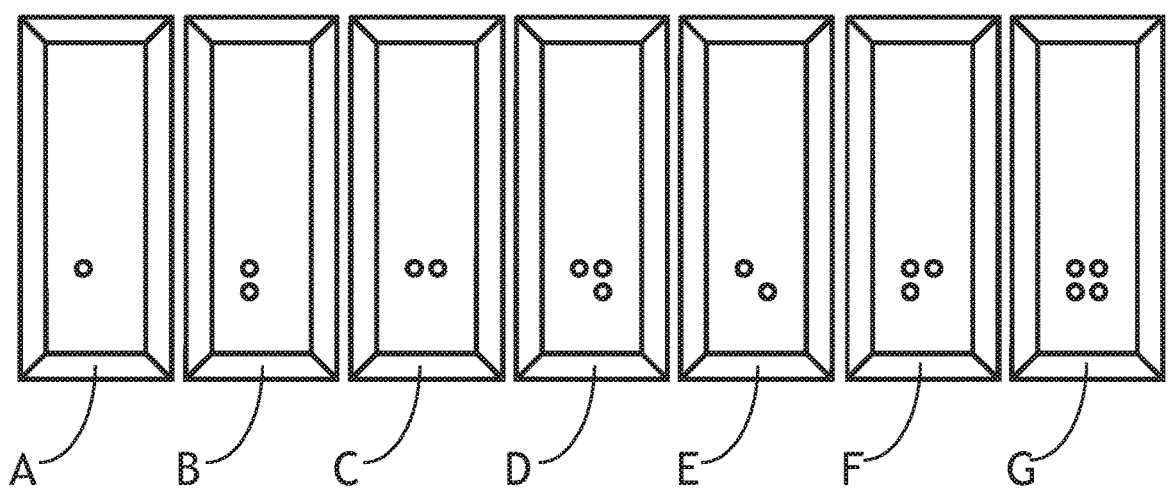
FIG. 26 is a top plan view of an alternate set of training aids.
Figure 27:
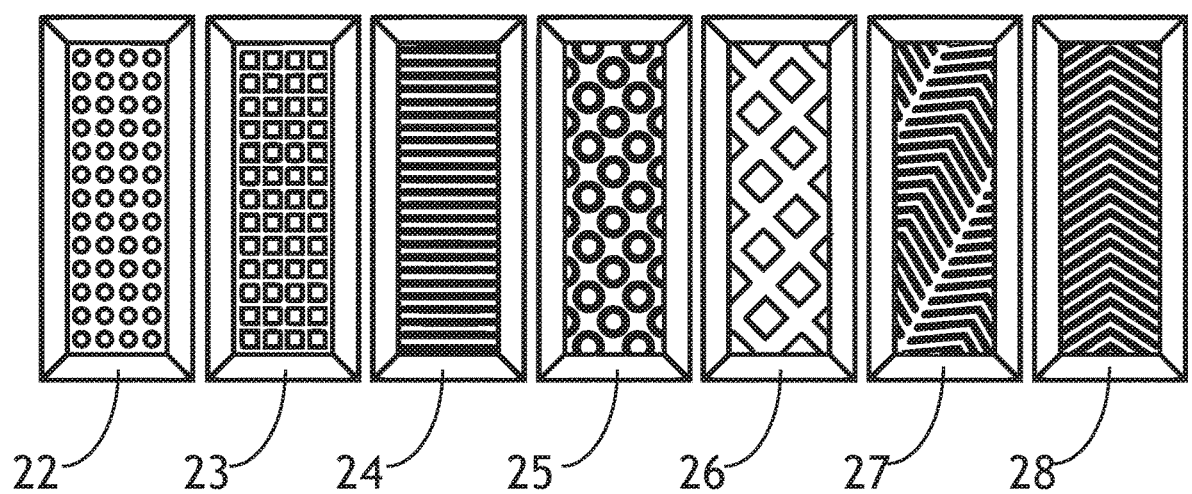
FIG. 27 is a top plan view of another alternate set of training aids.
Figure 28:
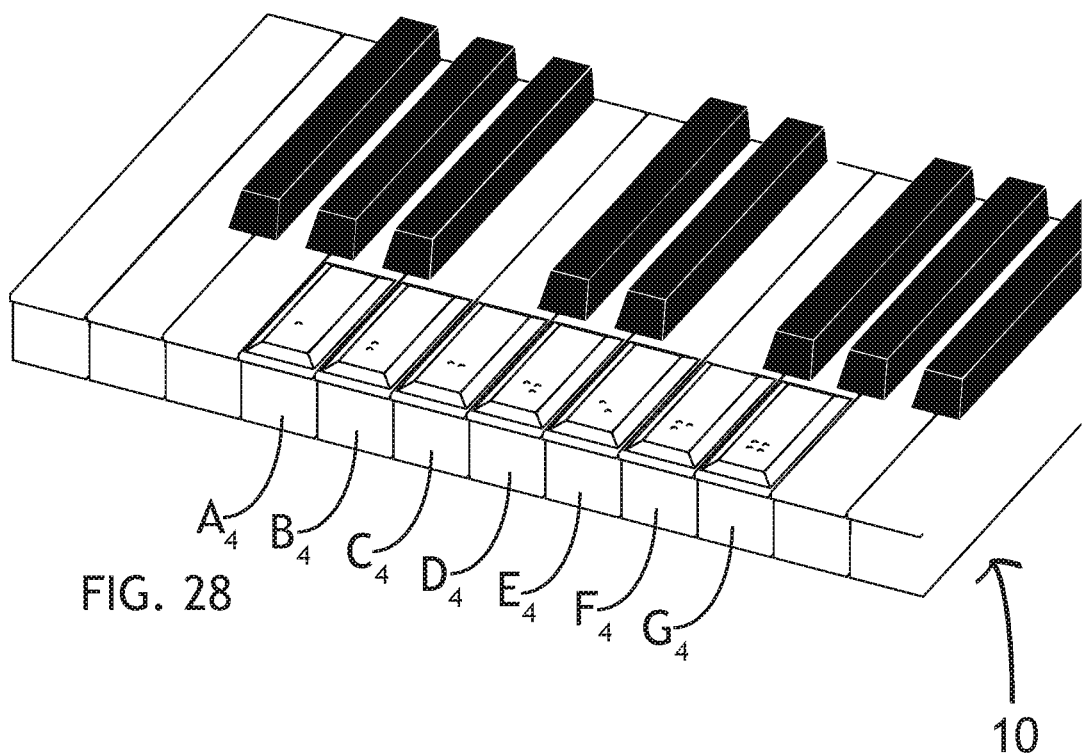
FIG. 28 is a perspective view of a partial keyboard with the training aids of FIG. 27 installed thereon.
Figure 29:
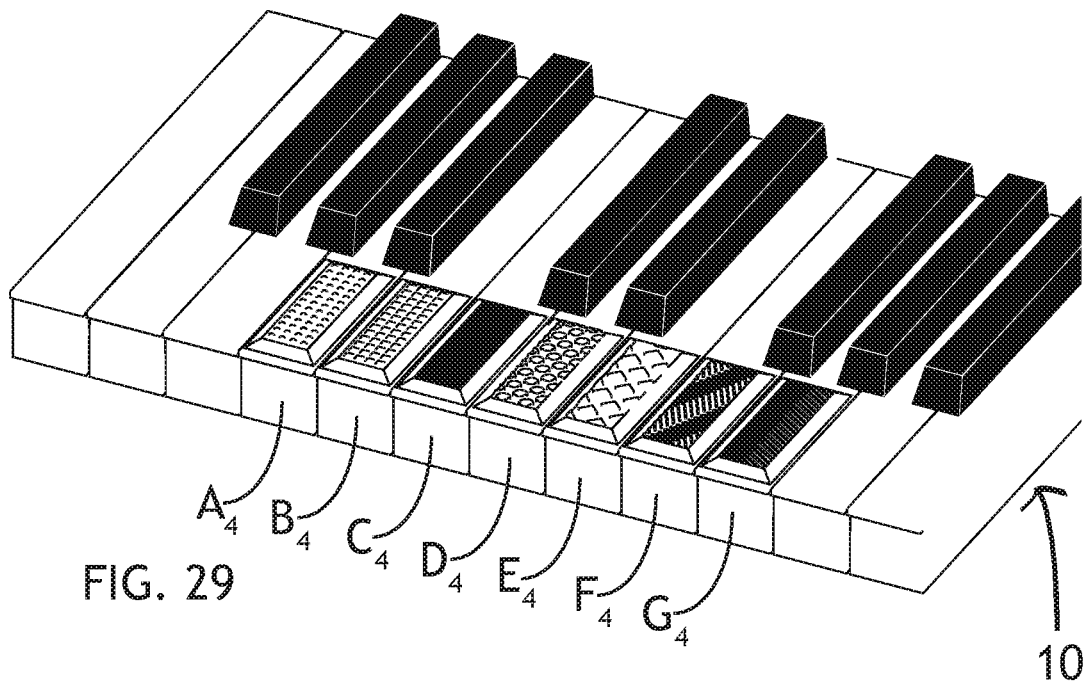
FIG. 29 is a perspective view of a partial keyboard with the training aids of FIG. 28 installed thereon.

Another embodiment of the method would be to place individual plates on each of the keys of the $4^{th}$ octave. Each plate may have a different texture on them to help differentiate what they are. As an example, in FIG. 26, the Braille alphabet is printed upon the top faces of the plates (A-G). This is an example of more subtle texturing that would be recognizable to a visually impaired student. More extreme texturing may be found in FIG. 27 where plates 22-28 all have distinct texturing. Placement is then made on the $4^{th}$ octave ($A_4$-$G_4$) on the keyboard as is shown in FIGS. 28 and 29.

Figure 30:
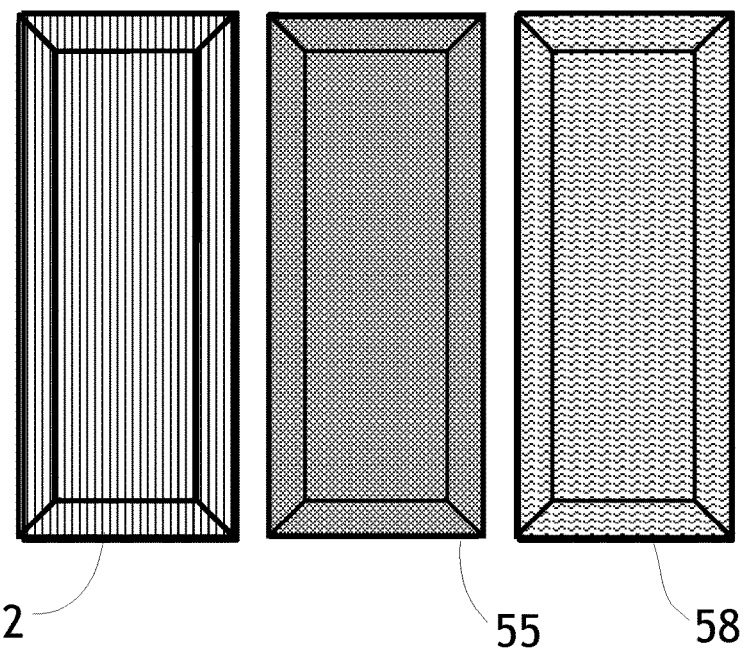
FIG. 30 is a further alternate set of colored training aids.
Figure 31:
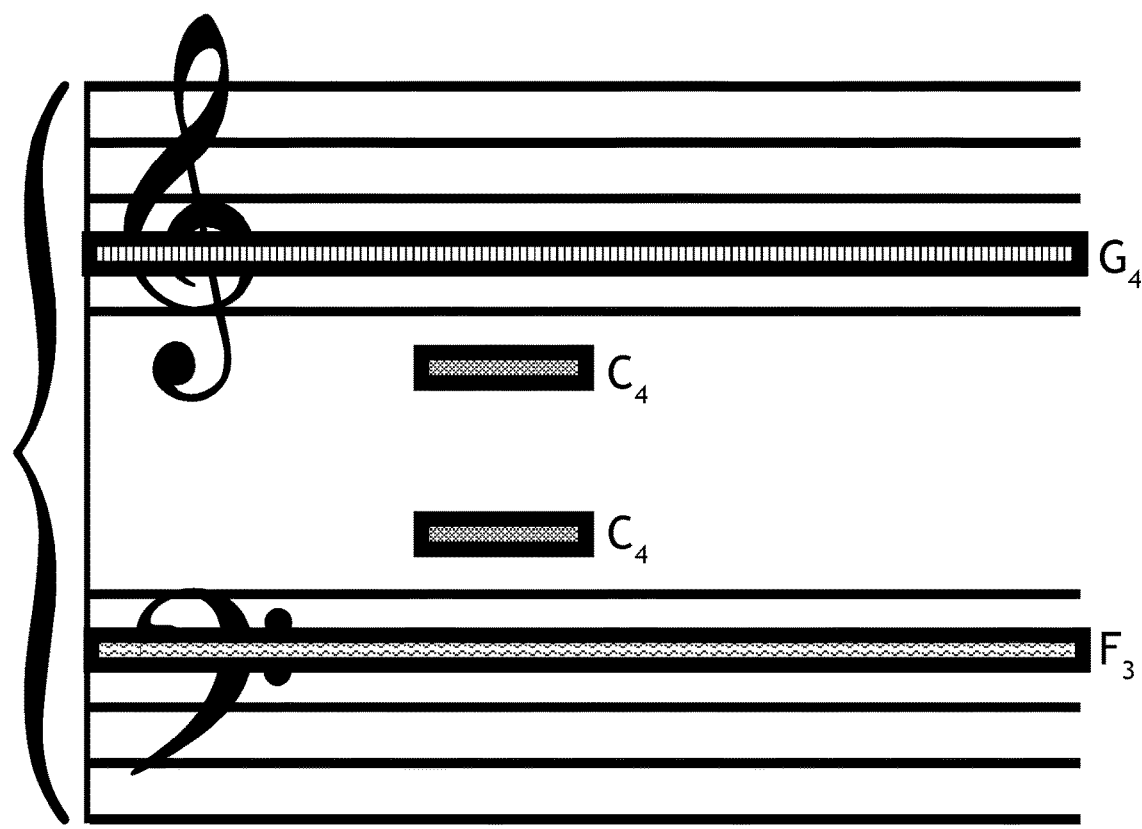
FIG. 31 is a depiction of a grand staff with the $F_3$, $C_4$, and $G_4$ lines colored in a manner akin the training aids of FIG. 30.
Figure 32:
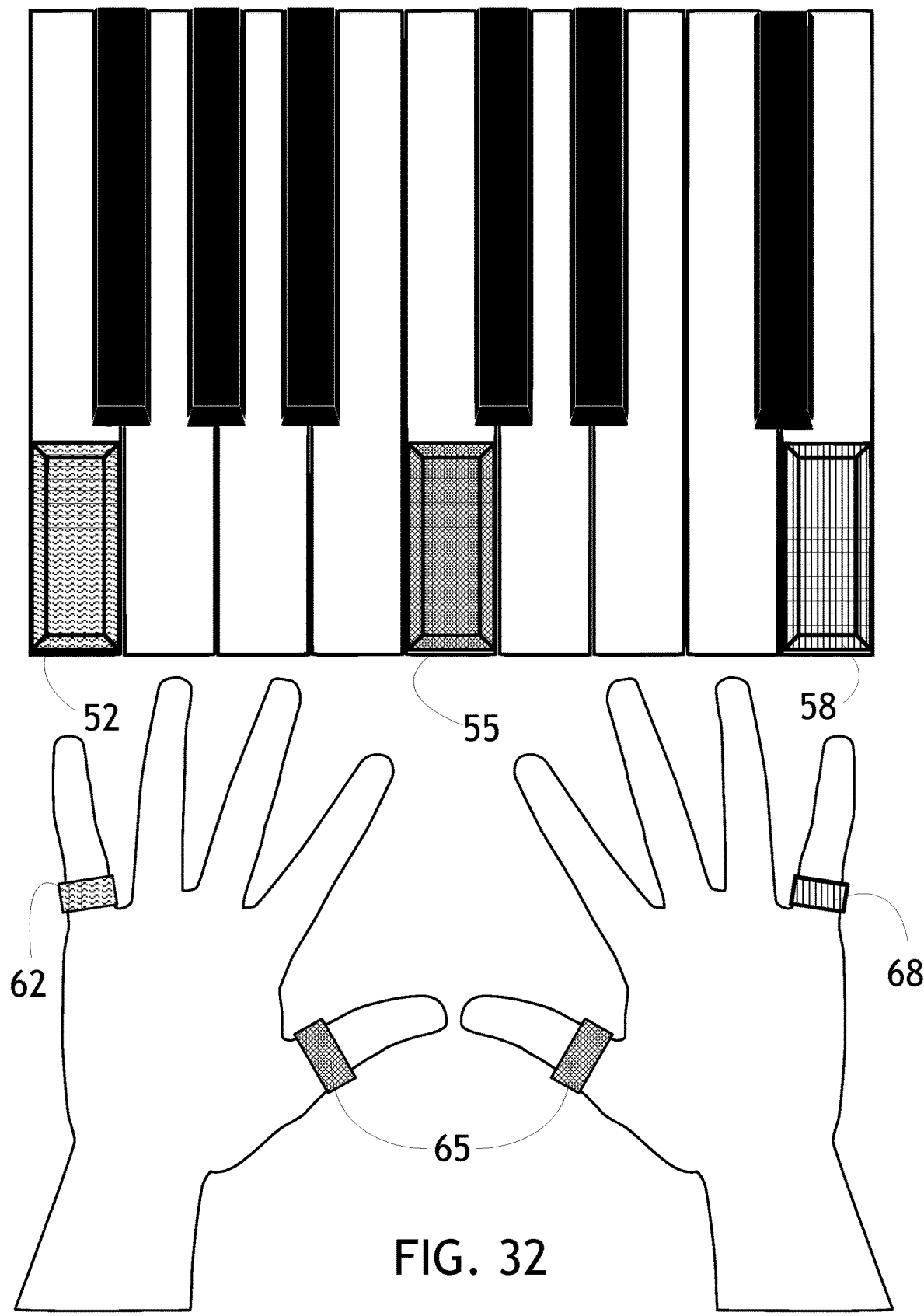
FIG. 32 is a top plan view of a user playing a keyboard while utilizing the training aids of FIG. 30 and a set of finger rings matching the colors of the training aids.

Yet another embodiment, which may be used in conjunction with the first embodiment, would also make each plate 52, 55, 58 distinct colors, as is shown in FIG. 30. Placement would then be made on the keyboard with a preference given to the border keys of $F_3$ and $G_4$ and middle C ($C_4$). The corresponding lines in the grand staff may also be colored (FIG. 31) with a line that corresponds to the color of the plate. Optionally, rings 62, 65, 68 or other adornments could be placed on the students' hands, with colors also corresponding to the plates (FIG. 32). The addition of color to individual fingers helps train the student to use those fingers with the keys matching their colors and enhances the muscle memory and training.

Although the present invention has been described with reference to preferred embodiments, numerous modifications and variations can be made and still the result will come within the scope of the invention. Placement of the plates may occur on any key or combination of keys other than those shown in this Specification (e.g. on all C's, on both $3^{rd}$ and $4^{th}$ octaves, etc.). Likewise, other means of differentiating the plates may be employed, such as making each plate a distinct color or using different textures. The plates may be made of any suitable material, with a preference to polymers because of the varied shapes, textures, and colors which may be employed in their manufacture, coupled with the relative low cost in the materials. No limitation with respect to the specific embodiments disclosed herein is intended or should be inferred.

What is claimed is:

1. A method of training an individual to play a musical keyboard, the method comprising placing at least one plate, having a minimum average thickness of 1.8 mm and a length at least nine times greater than the thickness, on a playable surface of at least one key of the musical keyboard,
wherein the plate serves as an anchor by which to aid in developing muscle memory.

2. The method of claim 1, one plate being placed on the key corresponding to $C_4$.

3. The method of claim 1, two plates being placed on the keys corresponding to $G_3$ and $F_4$.

4. The method of claim 1, three plates being placed on the keys corresponding to $G_3$, $C_4$, and $F_4$.

5. The method of claim 1, plates being positioned on keys corresponding to an octave.

6. The method of claim 5, the octave being the $4^{th}$ octave on the keyboard.

7. The method of claim 5, each plate having a different texture.

8. The method of claim 7, each plate's texture corresponding to letters in Braille notation.

9. A method of training an individual to play a musical keyboard, the method comprising placing at least three plates, each of the three plates having a minimum average thickness of 1.8 mm and a length at least nine times greater than the thickness, on a playable surface of three different keys on the keyboard,
wherein each plate serves as an anchor by which to aid in developing muscle memory.

10. The method of claim 9, each plate being a different color and each of said different colors are used to mark sheet music in a manner that corresponds to the keys on which the plates are placed.

11. The method of claim 9, three plates being placed on the keys corresponding to $G_3$, $C_4$, and $F_4$.

12. The method of claim 11, each plate being a different color and each of said different colors are used to mark sheet music such that $G_3$, $C_4$, and $F_4$ on a grand staff match the color of the plate positioned on each key.

13. A muscle memory aid for use in learning to play a musical keyboard, the memory aid comprising a plate having an average height being at least 0.48 mm, a length defined by its longest side and being at least nine times greater than the height, a width, and upper and lower faces with an adhesive positioned on the lower face, wherein the plate is positioned on a playable surface of key of a keyboard with the adhesive.

14. The muscle memory aid of claim 13, further comprising a concave profile of the upper face, with an axis along the length of the muscle memory aid.

15. The muscle memory aid of claim 13, the adhesive being a dry adhesive.

16. The muscle memory aid of claim 13, the adhesive being a wet adhesive.

17. A plurality of the muscle memory aids of claim 13, each muscle memory aid having a different color.

18. A plurality of the muscle memory aids of claim 13, each muscle memory aid having a different texture on its top face.

19. The plurality of muscle memory aids of claim 18, the different textures being letters written in Braille.

20. The muscle memory aid of claim 13, the upper face being sloped and coming to a distinct edge with the lower face thereby giving the plate an average thickness of at least 1.8 mm.

* * * * *